March 31, 1936.  W. C. MANGEL  2,035,972
TIRE SPREADER
Filed March 6, 1935
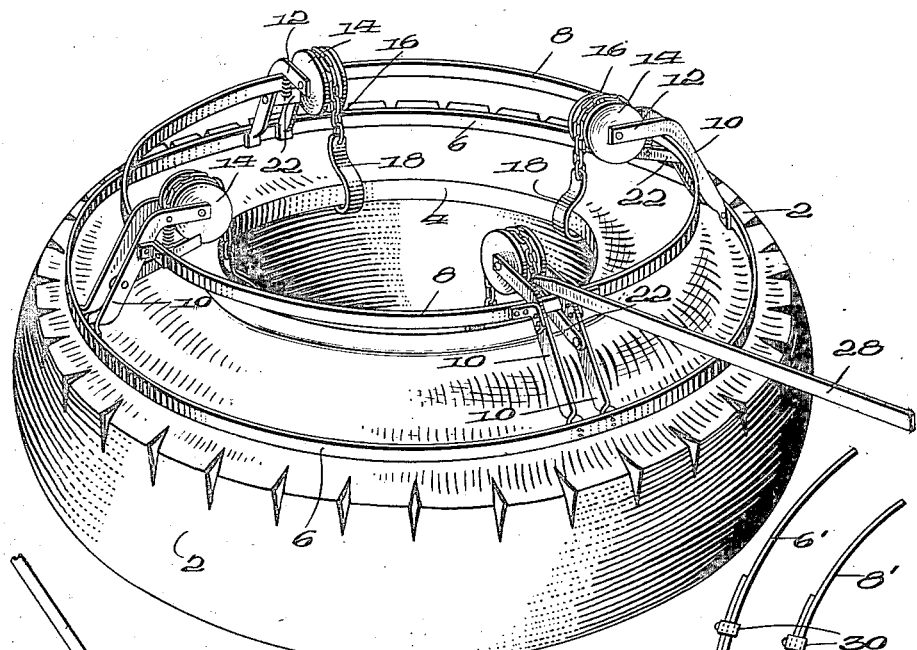
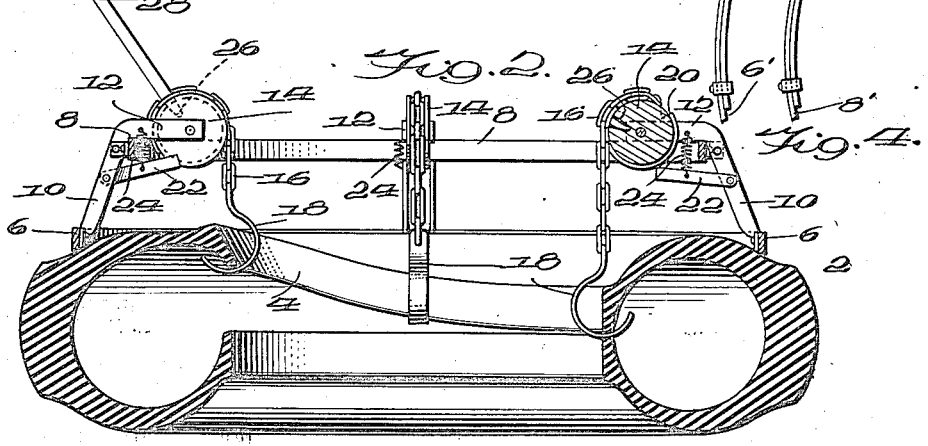
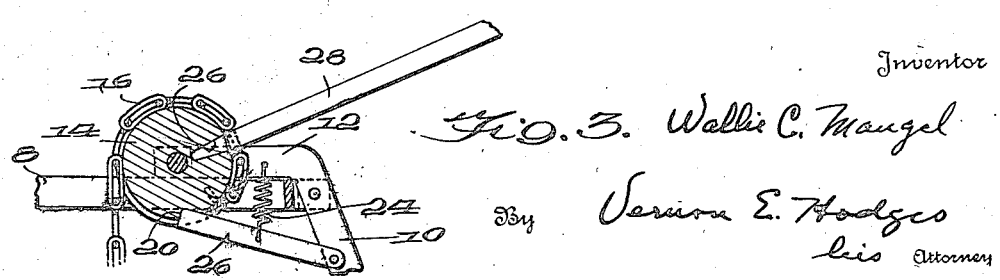
Inventor
Wallie C. Mangel
By Vernon E. Hodges
his Attorney Patented Mar. 31, 1936

2,035,972

UNITED STATES PATENT OFFICE 2,035,972

TIRE SPREADER

Wallie C. Mangel, Monteagle, Tenn., assignor to Braden N. Mulford, Fountain Head, Tenn.

Application March 6, 1935, Serial No. 9,671

10 Claims. (Cl. 152—27)

My invention relates to a tire spreader for automobile tires.

An object of my invention is to provide a tire spreader which will be made of light but strong and durable material, and can be utilized to spread an automobile tire without the use of the customary heavy and cumbersome tire spreader stand.

Another object of my invention is to provide a tire spreader which is expansible circumferentially, so that it may be applied to any size tire.

A still further object of my invention is to provide a tire spreader which may be applied to a tire and which may remain in place thereon for an indefinite period of time, and at the same time allow the tire to be moved into any desired position.

In the past tire spreaders, particularly those adapted for use on heavy bus or truck tires, have necessarily been made of very heavy material and are relatively immovable. After a bus or truck tire has been placed on such a tire spreading device and spread to be worked upon, the possibility of moving the tire in its spread condition was necessarily limited.

By the use of my new tire spreading device, even a cumbersome bus or truck tire may be spread and moved into practically any position while held in a spread condition, thus greatly facilitating the opportunity for inspecting and repairing the tire.

In the accompanying drawing,

Fig. 1 is a perspective view of a large tire held in an open or spread condition by my tire spreader;

Fig. 2 is a cross-section showing one portion of the tire in a spread condition, and the other portion thereof in its normally contracted condition;

Fig. 3 is an enlarged detail of the winding drum of the tire spreader; and

Fig. 4 is a fragmentary plan view of a modified form of my tire spreader.

The tire is conventional in form and is provided with a beading 4, which beading is normally in the position shown on the right of Fig. 2, but which beading must be pulled outwardly as shown at the left of Fig. 2 at a time when the inner tube (not shown) is to be removed to be repaired, or if the tire 2 itself is to be repaired.

My tire spreading device is provided with a member 6, as a substantially circular ring, to which is attached a smaller member 8, as a substantially circular ring, by means of the uprights 10, which uprights hold the member 8 in a position above the member 6. The uprights 10 are secured to the members 6 and 8 in pairs spaced relatively close together.

The upper ends of the uprights 10 are curved in a substantial L-shaped position, so that a projection 12 thereof extends over the member 8 and toward the center thereof. Each pair of these uprights 10 are spaced relatively close to one another, so that the L-shaped projections 12 thereof may rotatably support a winding drum 14 therebetween.

A chain 16 is secured to the winding drum 14 and a hook 18 is secured to the end of the chain 16, remote from the end thereof which is fixed to the winding drum 14.

The winding drum 14 is provided with a notch 20 which is adapted to receive a pawl 22, which pawl is pivotally secured to one upright 10, and is provided with a spring 24 bridging the space between the pawl 22, and the L-shaped projection 12.

The winding drum 14 is also provided with a hole 26 which is adapted to receive one end of a rod 28, so that the winding drum 14 may be rotated to be held in its wound position by the pawl 22.

In operation the device is placed on one side of the tire 2, so that the member 6 is resting upon the side wall of the tire 2, the inner and smaller member 8 being positioned above the tire 2, and the winding drums 14 extending over the inner portion of the tire approximately over the beading 4. With the device in this position, the hooks 18 on the chain 16 engage the beading 4, and the winding drums 14 are then ready to be rotated by the rod 28, so that the notch 20 thereof will become engaged by the pawl 22. After this has been done the tire would be in the position illustrated in Fig. 1, and on the left side of Fig. 2.

In a modified form of my device, I provide overlapping ends on the members 6' and 8', so that the ends thereof will overlap as illustrated in Fig. 4. The collars 30 are riveted or otherwise secured to one end of the members 6' and 8', and are adapted to receive the other end of the members 6' and 8', so that the free end may slide through the collars.

Collars 30 may be provided in one or more places around members 6' and 8', the contractibility and expansibility of the members being dependent on the number of collars 30 provided.

By the use of this modified form, I am able to either expand or contract the circumference of the members 6' and 8', so that the device may be more readily placed upon tires of different sizes.

The winding drums and their associated mechanisms are the same on the device as shown in Fig. 1, as the device which is fragmentarily illustrated in Fig. 4. It would be understood that when a tire is being worked upon and held in an expanded position as shown in Figs. 1 and 2, either one expanding device or two may be used. If one device only is used, only one side of the tire will be raised as shown on the left side of Fig. 2, but if another expanding device is used on the opposite side of the tire 2, the beading 4 on both sides of the tire will be expanded, and the inner portion of the tire will be held widely open to be worked upon. When one of these devices is used on each side of the tire, it will be obvious that the tire will be in a widely expanded condition and may be readily worked upon, it being possible to place the tire in any position to be worked upon, that is, it may be laid down on either side or may be held in a vertical position.

It will be understood that minor changes may be made from time to time, without departing from the spirit of the invention, and the scope of the appended claims.

I claim:

1. In a tire spreading device, the combination of a circumferential ring, uprights extending from said ring, winding drums supported by said uprights, and means attached to said winding drums for engaging the beading of a tire.

2. In a tire spreading device, the combination of a ring, uprights on said ring, means attached to the ends of said uprights remote from said ring for engaging a tire beading, and means for pulling said tire beading outwardly.

3. In a tire spreading device, a ring to lie against a tire side wall, uprights extending from said ring, winding drums rotatably secured to said uprights, hook means for engaging a tire beading, means for rotating said drums, and means for holding the drums in a wound condition.

4. In a device for spreading tire beadings, the combination of a ring, uprights attached to said ring, winding drums attached to said uprights, chains wound on said drums, hooks attached to said chains, means for revolving said drums, and means for holding said drums in a wound condition.

5. In a device for spreading tire beadings, a ring to engage the tire side wall, a ring spaced apart from said first-mentioned ring, and of different diameter, winding drums positioned within the said second ring, a hook member secured to said drums and adapted to engage the tire beading, means for rotating said drums, and means for locking said drums in their rotated position.

6. A tire beading spreader comprising a base ring, a ring of different diameter spaced apart therefrom, winding drums attached in close proximity to said second ring, means for engaging a tire beading attached to said drums, means for rotating said drums and spring urged means for locking said drums in a wound condition.

7. A tire beading spreader comprising a ring, a second ring spaced apart therefrom, winding drums attached in close proximity to said second ring, means attached to said winding drums for engaging a tire beading, and means for locking said winding drums, the circumference of said rings being expansible and contractible.

8. A tire spreader for automobile tires including two members, uprights extending from one member to the other, rotatably supported winding drums, means extending therefrom and detachably connected with the tire, and means for turning said drums.

9. A tire spreader for automobile tires including two members of different size, uprights extending from one member to the other and holding said members in spaced apart relation, winding drums supported by one of said members, means extending therefrom and detachably connected with the tire, and means for turning said drums.

10. A tire spreader for automobile tires including two members, uprights extending therebetween, rotatably supported winding drums, means extending therefrom and detachably connected with the tire, means for turning said drums, and means for expanding and contracting the circumferential size of said members.

WALLIE C. MANGEL.